United States Patent [19]
Ito et al.

[11] Patent Number: 5,608,717
[45] Date of Patent: Mar. 4, 1997

[54] INFORMATION RECORDING MEDIA AND OPTICAL DISC PRESENTING A CHARACTER OR A GRAPHIC PATTERN FORMED BY SPECIFIED PIT PATTERNS ON DATA TRACKS

[75] Inventors: Tamotsu Ito, Ayase; Hiroshi Banno, Koshigaya; Ryuichi Koike, Yokohama; Takashi Takeuchi, Fujisawa, all of Japan

[73] Assignee: Hitachi, Ltd., Tokyo, Japan

[21] Appl. No.: 301,889

[22] Filed: Sep. 7, 1994

[30] Foreign Application Priority Data

Sep. 7, 1993 [JP] Japan .................................. 5-221687
Apr. 1, 1994 [JP] Japan .................................. 6-65224

[51] Int. Cl.$^6$ .................................................. G11B 7/24
[52] U.S. Cl. .............................. 369/275.3; 369/275.1; 369/103
[58] Field of Search ........................... 369/275.1, 275.2, 369/275.3, 122, 111, 14, 33, 41, 47, 52, 13, 48, 103, 275.4, 273, 272, 274, 292, 280, 287; 358/342, 341; 360/72.2, 72.1; 235/457

[56] References Cited

U.S. PATENT DOCUMENTS

| | | | |
|---|---|---|---|
| 4,677,604 | 6/1987 | Selby, III et al. ...................... | 369/33 |
| 4,872,151 | 10/1989 | Smith ........................................ | 369/14 |
| 4,967,286 | 10/1990 | Nomula et al. ......................... | 358/342 |
| 5,136,560 | 8/1992 | Hangai et al. ........................... | 369/32 |
| 5,138,604 | 8/1992 | Umeda et al. ........................... | 369/103 |

FOREIGN PATENT DOCUMENTS

| | | |
|---|---|---|
| 0553545A3 | 8/1993 | European Pat. Off. . |
| 60-193143 | 10/1985 | Japan . |
| 2-20884 | 2/1990 | Japan . |
| 2-179941 | 7/1990 | Japan . |
| 2179941 | 12/1990 | Japan . |
| 4-16867 | 3/1992 | Japan . |
| 4-286768 | 10/1992 | Japan . |
| 4286768 | 12/1992 | Japan . |
| 5-334700 | 5/1993 | Japan . |
| 2250626 | 6/1992 | United Kingdom . |

*Primary Examiner*—Ali Neyzari
*Attorney, Agent, or Firm*—Antonelli, Terry, Stout & Kraus

[57] ABSTRACT

A CD-ROM is provided with an area for forming a character/graphic pattern. The character/graphic pattern is formed in such a way that data, which generate on the CD-ROM two sorts of pit patterns having average reflectances different from each other to a perceptible extent, are respectively recorded inside and outside the character/graphic pattern. Unless an illegal copy disc is produced by duplicating the legal original disc of the CD-ROM at a very high precision, the character/graphic pattern of the copy disc is invisibly deformed by the discrepancy between the arrangements of the pit patterns of the copy disc and the original disc.

22 Claims, 13 Drawing Sheets

DISC BASE

CARD ROTATION TYPE

HEAD ROTATION TYPE

CARD RECIPROCATION TYPE

BEAM SCAN TYPE

INFORMATION RECORDING MEDIA AND OPTICAL DISC PRESENTING A CHARACTER OR A GRAPHIC PATTERN FORMED BY SPECIFIED PIT PATTERNS ON DATA TRACKS

BACKGROUND OF THE INVENTION

1. FIELD OF THE INVENTION

The present invention relates to information recording media, such as an optical disc or an optical card, on which information are recorded in accordance with optical features. More particularly, it relates to techniques for inhibiting the illegal duplications of the information recording media.

2. DESCRIPTION OF THE RELATED ART

A CD-ROM (compact disc read only memory), which is a kind of optical disc, can be mentioned as a typical example of information recording media on which information are recorded by affording optical features thereto.

Many types of CD-ROM adopt the CLV (constant linear velocity) system in which data are recorded using pits of regular intervals. This CLV system can make the data capacity of the CD-ROM larger than the CAV (constant angular velocity) system in which data are recorded using pits of intervals determined in accordance with the radial positions of the CD-ROM so that angles with respect to the center thereof may be held constant at all times. Besides, in the CD-ROM's, frames are set as record units irrespective of the CLV system and the CAV system. As illustrated in FIG. 18 of the accompanying drawings, each frame 1 is composed of data of fixed length, and a sync signal 2 affixed to the head of the data.

Incidentally, it is also possible that the CLV system and the CAV system coexist on one optical disc.

By way of example, according to a technique disclosed in the official gazette of Japanese Utility Model Registration Application Publication (KOKOKU) No. 44927/1993, an optical disc is provided with a record area based on the CLV system and a record area based on the CAV system, and still picture data, etc. are recorded in the latter record area. In addition, according to a technique disclosed in the official gazette of Japanese Patent Application Publication (KOKOKU) No. 33470/1993, an optical disc is provided with a record area based on the CLV system and a record area based on the CAV system, and the positions of the respective record areas are separately recorded as address information. The address information are utilized for the change-over between the rotational controls of a disc motor for the record area based on the CLV system and the record area based on the CAV system.

In this specification, an "original disc (original version)" is intended to mean a CD-ROM which is lawfully produced from a "legal master disc (legal master version)". On the other hand, a "copy disc (copy version)" is intended to mean a CD-ROM which is unlawfully produced from an "illegal master disc (illegal master version)" that is, in turn, prepared from the original disc.

At present, CD-ROM's are extensively utilized for recording digital data such as various sorts of software, document data and image data.

Such digital data which are recorded on the CD-ROM's are usually under the protection of copyrights. Nevertheless, the production and sale of illegal copy discs of the CD-ROM's have heretofore recurred.

Especially in the fields of software for games and electronic publications including independent volumes, dictionaries etc., the production of the illegal copy discs has often been organically made and has formed a factor for hampering normal commercial transactions.

The above mentioned copy discs of the optical disc such as CD-ROM can be produced from the illegal master disc thereof. This illegal master disc of the copy discs is prepared from a mold in which the shapes of pit arrays recorded in the information recording surface of the original disc of the optical disc are transferred by the use of a plastics material or the like. The molding technique, however, often fails to exactly produce the copy discs for the reason that the shapes of the pit arrays need to be transferred after the protective film of the original disc is removed to expose the pit array surface, so the arrayed pits are deformed at the stage of removing the protective film. Especially in a case where the protective film is rigid, the production of the copy discs of the optical disc is very difficult.

Therefore, the illegal master disc of the copy discs of the optical disc is ordinarily prepared using data read out of the original disc of the optical disc, just as in the case of producing the original disc from the legal master disc of the optical disc.

Meanwhile, in order to prevent a pirate from producing such copy discs of the optical disc, a copyright has heretofore been indicated on the front surface of the original disc of the optical disc by carving or printing characters, a graphic or the like.

In addition, examples to be mentioned below have been known as prior-art techniques for discriminating the illegal copy disc of the optical disc from the legal original disc thereof.

The technique disclosed in the official gazette of Japanese Patent Application Laid-open No. 286768/1992 utilizes the fact that the sync signal 2 stated before with reference to FIG. 18 cannot usually be read out as data. With this technique, another signal is substituted for part of the sync signal 2 and is recorded beforehand. In playing back an optical disc, the presence or absence of the substitute signal is especially detected, and the optical disc is decided as an illegal copy disc in the absence of the substitute signal.

In the official gazette of Japanese Utility Model Registration Application Laid-open No. 20884/1990, it is disclosed to form a visible pattern on the front surface of the signal recording layer of an optical disc. Also, it is disclosed in the official gazette of Japanese Patent Application Laid-open No. 179941/1990 that a pattern or the like which is visible is formed by changing the pit shapes of the signal surface of an optical disc.

Regarding the technique disclosed in the official gazette of Japanese Patent Application Laid-open No. 286768/1992, the sync signal 2 including the substitute signal can be, in itself, reproduced. Therefore, it is not very difficult to produce an illegal copy disc of the optical disc in which the sync signal 2 including the substitute signal is stored.

On the other hand, according to the technique disclosed in the official gazette of Japanese Utility Model Registration Application Laid-open No. 20884/1990 or Japanese Patent Application Laid-open No. 179941/1990, the step of forming characters, a graphic or the like needs to be separately performed in addition to a conventional process for preparing the master disc of the optical disc.

SUMMARY OF THE INVENTION

The present invention has for its object to offer an information recording medium whose master disc can be prepared by a process similar to the conventional one, and which is formed with a visible pattern that is very difficult to reproduce on the copy disc of the information recording medium.

Another object of the present invention is to offer a playback system which can refuse the utilization of an illegal information recording medium produced by duplicating a legal information recording medium.

In one aspect of performance of the present invention for accomplishing the first object, an information recording medium, such as an optical disc, which has a record surface, and which records information in terms of pit patterns formed on a plurality of tracks of the record surface and corresponding to data to-be-recorded; comprises:

at least one area which is provided on the record surface, and in which a specified pit pattern corresponding to either of specified data or a specified data pattern is concentratedly formed in order that either of a character pattern or a graphic pattern having a size which is visible on the basis of a difference between light reflectances may be presented in a pattern displaying area provided on the record surface;

an average light reflectance of the specified pit pattern differing from an average optical reflectance of surroundings of the at least one area to a visually perceptible extent.

In another aspect of performance of the present invention for accomplishing the second object, in the case where such an information recording medium is the optical disc, a playback system for playing back the optical disc comprises a memory for storing therein positional information which specifies a position of the pattern displaying area of the optical disc; reproduction means for reproducing the data recorded on the mounted optical disc; control means for reproducing the data from either of the area or the areas of the record surface of the mounted optical disc through the reproduction means, the either of said area or the areas being specified by the positional information stored in the memory; and reproduction inhibition means for suspending subsequent playback of the mounted optical disc on condition that the reproduction of the data from the either of the area or the areas as specified by the positional information has failed.

In accordance with the information recording medium of the present invention as mentioned above, the specified pit pattern corresponding to either the specified data or the specified data pattern is concentratedly formed, whereby the visible character/graphic pattern is expressed on this information recording medium.

When the illegal copy disc of the information recording medium is produced by duplicating the data, the arrangement of such a pit pattern deviates due to a precisional problem. Moreover, it is very difficult to confine the deviation to the extent that the character/graphic pattern shaped by the arrangement of the pit pattern is not greatly deformed. It is accordingly very difficult for the character/graphic pattern existing on the legal original disc of the information recording medium to be similarly duplicated on the illegal copy disc.

Besides, in accordance with the playback system of the present invention as mentioned above, the data is reproduced from the area of the mounted optical disc containing the character/graphic pattern, and the subsequent playback of the mounted optical disc is suspended on condition that the reproduction of the data has ended in failure. Therefore, even when the character/graphic pattern has been formed on an optical disc by any expedient other than the data duplication, the optical disc cannot be played back and utilized.

That is, such an illegal copy disc has its utilization refused in the playback system according to the present invention.

PREFERRED EMBODIMENTS OF THE INVENTION

Embodiments of an information recording medium and a playback system for the playback thereof according to the present invention will be described below by taking as an example a case where the information recording medium is a CD-ROM which is a kind of optical disc.

Now, the first embodiment of the present invention will be described.

Figure 1:
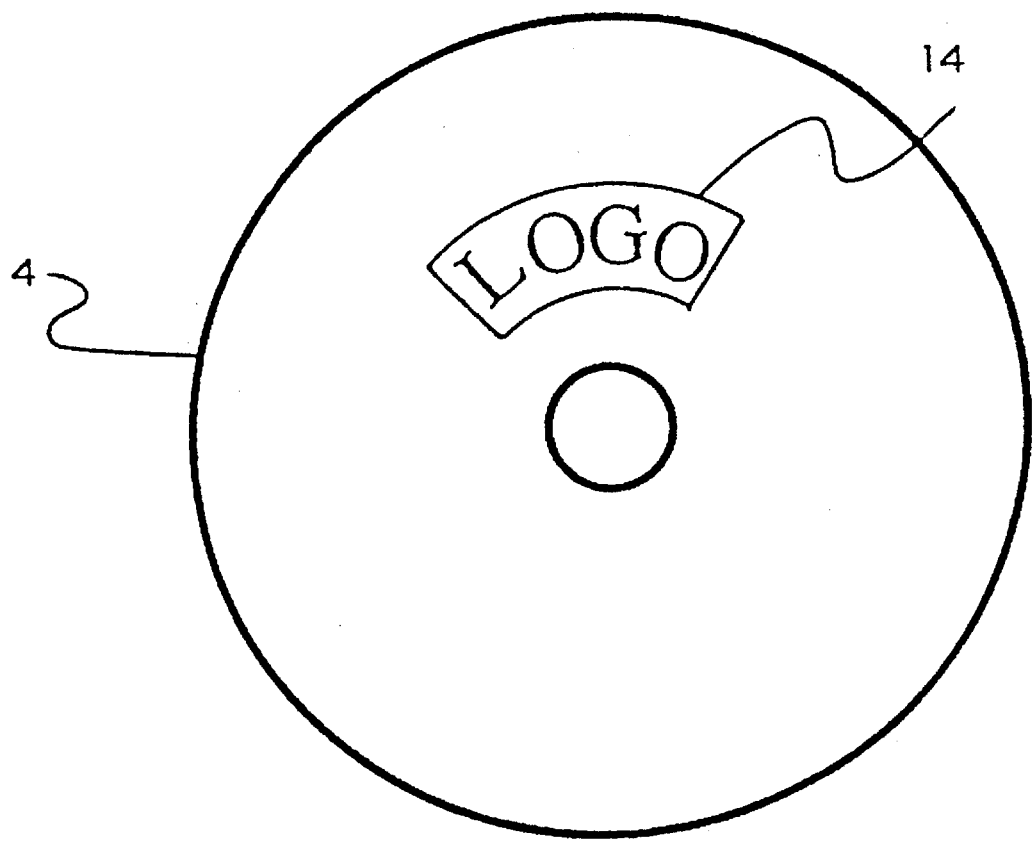
FIG. 1 is a plan view showing the external appearance of a CD-ROM in the first embodiment of the present invention.

FIG. 1 illustrates the signal surface of a CD-ROM in this embodiment.

In this embodiment, the signal surface of the CD-ROM 4 is provided with a character/graphic pattern 14 which is visible, that is, which can be seen with the naked eye.

Herein, the character/graphic pattern 14 shall express the content of the copyright of data or a program stored in the CD-ROM 4, the trademark of the data stored in the CD-ROM 4 or that of the CD-ROM 4 itself, or the content of any other right concerning the data stored in the CD-ROM 4 or the CD-ROM 4 itself. Of course, the character/graphic pattern 14 may well express any other item.

How the character/graphic pattern 14 is formed, will be elucidated below.

First, how to record data on the signal surface of the CD-ROM 4 will be explained.

By way of example, the data are modulated by the EFM (eight-to-fourteen modulation) system which is applied to a CD for musical use, and the modulated data are recorded in the signal surface of the CD-ROM 4 by the CLV system.

More specifically, data, each being composed of 8 as listed in the left column of Table 1 below, are respectively converted into EFM channel bit patterns each being composed of 14 [bits] as listed in the right column of the table. Further, channel bit patterns of 17 [bits] are respectively generated by adding margin bits of 3 [bits] to each of the EFM channel bit patterns of 14 [bits] and each of them is recorded as one unit on the CD-ROM 4.

TABLE 1

| Data | EFM Channel Bit Pattern | |
|------|------------------------|---|
| 000  | 01001000100000         |   |
| 001  | 10000100000000         |   |
| 002  | 10010000100000         |   |
| .    |                        |   |
| .    |                        |   |
| .    |                        |   |
| 088  | 01001000000100         |   |
| 089  | 10000000000100         | 11T Pattern |
| 090  | 10010000000100         |   |
| .    |                        |   |
| .    |                        |   |
| .    |                        |   |
| 167  | 00100100001001         |   |
| 168  | 01001001001001         | 3T Pattern |
| 169  | 10000001001001         |   |
| .    |                        |   |
| .    |                        |   |
| 255  | 00100000010010         |   |

Figure 2:
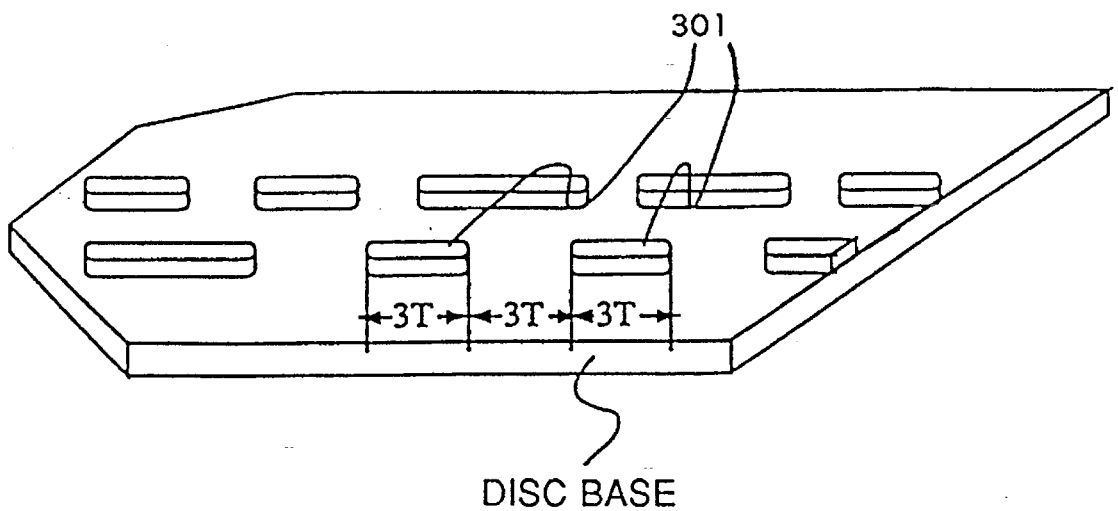
FIG. 2 is a fragmentary view showing the shape of a pit pattern which is borne on the CD-ROM of the first embodiment.

Subsequently, a master disc is prepared. The signal surface of the CD-ROM 4 is formed by the master disc with the patterns of microscopic protrusions (pits) of predetermined width and height as shown in FIG. 2, the pit patterns being determined in accordance with the values of the channel bit patterns. The preparation of the master disc is carried out in such a way that, while being rotated by a disc motor (a spindle motor), the master disc is formed with pit patterns therefor on tracks-to-be-formed by a laser. Incidentally, the pits are sometimes microscopic recesses of predetermined width and depth.

On this occasion, the data "1" of the channel bit pattern corresponds to the edge of each pit. By way of example, the 8-bit data "168" indicated in Table 1 is converted into the EFM channel bit pattern "01001001001001", in which the data "1" appears every third bit. Accordingly, when letter T is let denote a pit length corresponding to one channel bit, the pit pattern corresponding to the 8-bit data "168" includes two pits 301 each of which is 3T long and which are spaced 3T from each other.

Likewise, the pit pattern corresponding to the data "89" includes a pit which is 11T long. By the way, in the case of the EFM system indicated in Table 1, the smallest pit length becomes 3T, and the greatest pit length becomes 11T.

Subsequently, the pit patterns are transferred from the prepared master disc onto the signal surface of the CD-ROM 4. Further, a light reflection film such as aluminum thin film is deposited by vacuum evaporation onto the whole signal surface of the CD-ROM 4 formed with the pits, and a transparent protective layer is formed thereon.

In the CD-ROM 4 thus produced, the reflectances of the pit portions and non-pit portions (land portions) thereof for light are different. In the playback operation of the CD-ROM 4, therefore, the channel bits are reproduced to read the data owing to the changes of the light reflectances.

Meanwhile, in this embodiment, the visible character/graphic pattern 14 is formed on a part of the signal surface of the CDLROM 4 by utilizing the difference of the reflectances of the pit portions and the non-pit portions.

More specifically, owing to the difference of the reflectances of the pit portions and the non-pit portions, average reflectances for light become different between a certain pit pattern and a different pit pattern. Therefore, such certain pit patterns are concentrated or crowded in the shape of the desired character/graphic pattern 14, and such different pit patterns are arranged outside the character/graphic pattern 14.

This embodiment utilizes the pit patterns corresponding to the 8-bit data "168" stated before, and the pit patterns corresponding to the 8-bit data "89".

Figure 3:
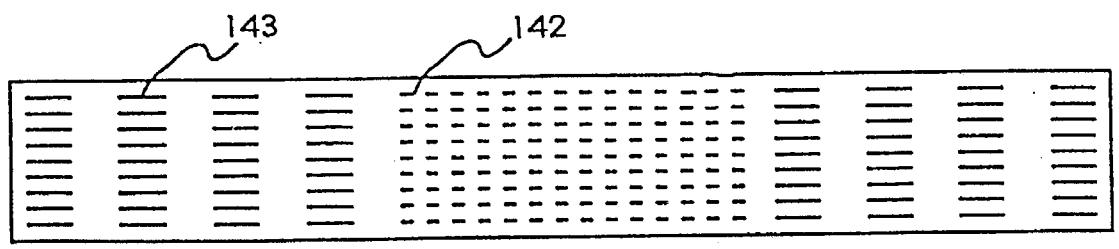
FIG. 3 is a diagram for explaining the pit patterns of the CD-ROM of the first embodiment.

FIG. 3 is a diagram in which a part of the character/graphic pattern 14 borne on the signal surface of the CD-ROM 4 is enlarged and depicted. Here, the data constitutes one frame conjointly with a synchronizing pattern, error correcting information, etc., and the pit pattern is formed for the frame. In actual fact, accordingly, bit patterns corresponding to the respective channel bits of the synchronizing pattern and the error correcting information appear between the adjacent bit patterns corresponding to the data. The proportion of the affixed bit patterns, however, is only slight relative to the bit patterns of the data. In FIG. 3, therefore, it is assumed, for the brevity of illustration, that each frame is constituted by only the pit pattern corresponding to the data. Pit patterns corresponding to the margin bits stated before are also omitted from the illustration.

In the illustrated example, one of the interior and exterior of the character/graphic pattern 14 is configured of the pit patterns each of which corresponds to the data "89" and includes the pits 142 being 3T long, while the other is configured of the pit patterns each of which corresponds to the data "168" and includes the pit 143 being 11T long. Such an arrangement is based on the fact that, as explained before, the smallest pit length and the greatest pit length are 3T and 11T in the EFM system, respectively, so the greatest difference of reflectances is exhibited between the pit patterns of the data "89" and the data "168".

The interior and exterior of the character/graphic pattern 14 may well be configured of two sorts of pit patterns different from the above, which correspond to the combination of other data and which realize the difference of reflectances posing no problem in vision. It is also allowed that only one of the interior and exterior of the character/graphic pattern 14 is configured of pit patterns corresponding to specified data, desirably, data whose pit patterns afford a reflectance higher or lower than an average reflectance, while the other is configured of a set of pit patterns corresponding to a set of random data. This contrivance is based on the fact that, since each pit is microscopic in vision, the set of pit patterns corresponding to the set of random data will exhibit a substantially averaged reflectance as the whole set. Further, either of the interior or exterior of the character/graphic pattern 14 may well be configured of pit patterns which correspond to the combination of a plurality of sorts of specified data. Still further, both the interior and exterior of the character/graphic pattern 14 may well be configured of pit patterns which correspond to different combinations each consisting of a plurality of sorts of specified data.

In this manner, according to this embodiment, the character/graphic pattern 14 is formed by utilizing the pit patterns which correspond to the data ordinarily used. Conversely, the formation of the character/graphic pattern 14 can be effected similarly to the recording of the ordinary data. Herein, however, the pit patterns constituting the character/graphic pattern 14 need to be formed at a high positional accuracy. Accordingly, in the case of the example where the master disc is formed with the pit patterns therefor by the laser while being rotated by the disc motor, the positions of the pits to be formed are strictly controlled to desired ones by the use of an encoder attached to the disc motor, or any other measurement means.

In this way, the CD-ROM 4 formed with the character/graphic pattern 14 can be produced in accordance with either of the CLV or CAV systems.

Now, let's consider a case where a CD-ROM of copy edition (an illegal copy disc) is produced from the CD-ROM 4 thus formed with the character/graphic pattern 14 by the CLV system.

As already defined before, the CD-ROM produced from the legal master disc shall be called the "original disc", and the illegal CD-ROM produced by duplicating the original disc shall be called the "copy disc".

In the case of preparing the master disc of the original disc, the master disc is formed with the pit patterns therefor in the above-stated way that the master disc is traced by the laser while being rotated by the disc motor. On this occasion, subject to the CLV system for the preparation of the master disc, the rotational velocity of the disc motor for rotating the master disc is controlled as explained below.

The rotational velocity which is stipulated by a predetermined reference frequency is set for the disc motor. This rotational velocity is controlled so as to increase at a predetermined rate radially outwards in order that a linear velocity at which the laser traces the master disc may be held constant. Simultaneously, the channel bits are read out one by one in accordance with a predetermined clock cycle, and write signals for controlling the output power of the laser are generated on the basis of the values of the channel bits. Thus, the pits are formed in succession.

In playing back the original disc, the rotational velocity thereof is controlled in order that the cycles of signals reproduced by an optical pickup may be held constant. Herein, the channel bits and data are successively restored on the basis of the values of the reproduced signals read out by the optical pickup. Owing to the above control of the rotational velocity, the linear velocity of the original disc increases at a predetermined rate radially outwards.

Meanwhile, the preparation of the illegal master disc of the copy disc proceeds similarly to that of the legal master disc of the original disc. The rotational velocity of a disc motor as is stipulated by a predetermined reference frequency is controlled in order that a linear velocity at which a laser traces the master disc may be held constant. In this state, the channel bits reproduced from the original disc are read out one by one in accordance with a predetermined clock cycle, and write signals for controlling the output power of the laser are generated on the basis of the values of the channel bits. Thus, the pits of the master disc are formed in succession.

Here, in order to prevent deviations or discrepancies of pit intervals from developing between the copy disc and the original disc, it is essential that the relationship, in the preparation of the master disc of the copy disc between, the linear velocity of the master disc being traced by the laser and the clock cycle for generating the write signals, is in agreement with the relationship, in the preparation of the master disc of the original disc, between the linear velocity of the master disc being traced by the laser and the clock cycle for generating the write signals.

However, granted that the clock cycles for generating the write signals in the cases of preparing the master discs of the copy disc and the original disc are in perfect agreement, the linear velocities in both the cases cannot be brought into perfect agreement because of the problems of the precisions of the reference frequencies and the rotation controls. Accordingly, the deviations of the pit intervals develop between the copy disc and the original disc.

It is now supposed that the difference between the clock cycles for generating the write signals in the cases of preparing the master discs of the copy disc and the original disc is also calculated in terms of the difference between the linear velocities in the cases of preparing these master discs. Under the supposition, the deviations of the pit intervals will be studied concerning the linear velocity in the playback of the original disc and the difference between the linear velocities in the cases of preparing the master discs of the copy disc and the original disc.

Figure 4A:
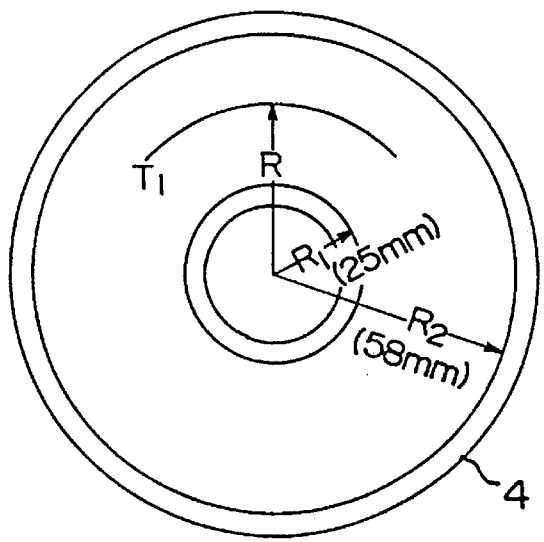
FIGS. 4A and 4B are diagrams for explaining those deviations of pits which occur in the case of duplicating the CD-ROM of the first embodiment.
Figure 4B:
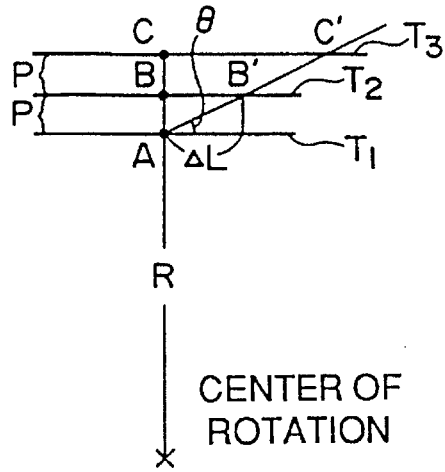

FIG. 4B illustrates the positional relations of three tracks $T_1$, $T_2$ and $T_3$ which are successively adjacent on the CD-ROM shown in FIG. 4A. In addition, points A, B and C indicate pits which are respectively formed on the tracks $T_1$, $T_2$ and $T_3$. The pits A, B and C are aligned in the vertical direction as seen in FIG. 4B (in the radial direction of the CD-ROM), and they constitute the contour part of the character/graphic pattern.

Here, when the point A is set as a reference point by way of example, the points B and C of the original disc are relatively shifted to points B' and C' on the copy disc, respectively.

It is considered that the master disc of the copy disc is rotated a rotational distance at a linear velocity $v+\Delta v$ in a time period in which the master disc of the original disc performs one revolution at a linear velocity $v$. The distance $\Delta L$ of the shift of the point B to the point B' corresponds to the magnitude of deviation of the rotational distance of the master disc of the copy disc from the revolution of the master disc of the original disc. Therefore, the distance $\Delta L$ is given by Equation (1):

$$\Delta L = 2\pi R(\Delta v/v) \tag{1}$$

where letter R denotes a radial length from the center of rotation of the disc to the track $T_1$.

In the CD-ROM, the inner radius $R_1$ of the record surface in which the data are recorded is 25, and the outer radius $R_2$ thereof is 58. Therefore, the distance $\Delta L$ within the signal surface becomes:

$$\Delta L = (15.7 \text{ to } 36.4) \times 10^4 \, (\Delta v/v)[\mu m] \quad (2)$$

Besides, the angle $\theta$ of a segment AB' relative to the rotating direction of the disc is given by:

$$\theta = \tan^{-1}(P/\Delta L) \quad (3)$$

where letter P denotes the pitch of the tracks $T_1$ etc., which is 1.6 [μm] in the CD-ROM.

Thus, assuming a tracking linear velocity deviation ratio ($\Delta v/v$) to be $1 \times 10^{-4}$, $\Delta L = 15.7$ to 36.4 [μm] and $\theta = 5.8$ to 2.5 [degrees] hold. That is, when the tracking linear velocity deviation ratio is on the order of $10^{-4}$ (0.01 [%]), the character/graphic pattern borne on the original disc comes to incline substantially horizontally on the copy disc. It is next to impossible to identify such a horizontal character/graphic pattern.

Further, assuming the tracking linear velocity deviation ratio ($\Delta v/v$) to be $1 \times 10^{-5}$, $\theta = 45.5$ to 23.7 [degrees] holds. Although the character/graphic pattern inclines, it is scarcely identifiable.

In view of the above calculations, in order to endow the copy disc with the character/graphic pattern which is visible enough to be regarded as being identical to that of the original disc, the linear velocity of the master disc of the copy disc must be controlled at a linear velocity deviation ratio of $1 \times 10^{-6}$ or below granted that the clock cycles for generating the write signals are in perfect agreement. In other words, even a very slight deviation in the linear velocity is greatly influential to the extent that the character/graphic pattern etc. becomes unidentifiable.

It is technically very difficult, however, to control the linear velocity at such a high precision during the preparation of the master disc of the copy disc. Moreover, since the clock cycles for generating the write signals do not actually agree perfectly, the linear velocity needs to be controlled at a still higher precision when duplicating the original disc.

By the way, in the standards of CD's for the CLV system including the CD-ROM, the tracking linear velocities are stipulated within a comparatively moderate range of 1.2 to 1.4 [m/sec]. Therefore, a pirate intending to duplicate the original disc cannot know that the rotational velocity of the original disc in the playback and production thereof need to be at the precision of or below $1 \times 10^{-6}$ beforehand.

Accordingly, if the pirate intends to obtain a copy disc formed with the character/graphic pattern favorably, he/she needs to prepare the master disc of the copy disc and find out the tracking linear velocity at which the character/graphic pattern appears, while changing the linear velocity little by little at the precision of or below $1 \times 10^{-6}$. Such operations, however, are almost impossible from the viewpoints of technical difficulty and job efficiency.

Furthermore, since the standard of the tracking linear velocity is moderate as stated above, the fluctuation thereof within the stipulated values poses no problem. In preparing the master disc of the original disc, therefore, random fluctuations may well be intentionally bestowed on the pit intervals within limits within which the fluctuation within the stipulated values arises in the linear velocity in the case where the rotational velocity is controlled so as to hold constant the cycles of the signals reproduced from the original disc by the optical pickup. In this way, unless the fluctuation corresponding to the fluctuations of the pit intervals is bestowed on the linear velocity in the preparation of the master disc of the copy disc, the character/graphic pattern cannot be formed favorably.

As thus far described, according to this embodiment, when the copy disc of the CD-ROM (the CD-ROM of copy version) is produced using the reproduced signals derived from the original disc of the CD-ROM 4 (the CD-ROM of original version) of the CLV system bearing the character/graphic pattern 14 thereon, the character/graphic pattern 14 becomes distorted or nonexistent on the copy disc. As a result, if the CD-ROM is the illegal copy disc can be visually identified depending upon the presence or absence of the exact character/graphic pattern 14, without the necessity of checking the played-back contents of the CD-ROM. Incidentally, it has heretofore been common practice to fasten the label of a character/graphic pattern on the original disc or to carve a character/graphic pattern in the original disc. Such a character/graphic pattern mechanically formed is very easy to duplicate. In contrast, the character/graphic pattern based on this embodiment is very difficult to duplicate as stated before, because it is formed using the pit patterns of the signal surface.

Now, the second embodiment of the present invention will be described.

In this embodiment, an area for forming pits in accordance with the CAV system is especially provided in part of the original disc of a CD-ROM of the CLV system, and a character/graphic pattern is formed in the area as explained before.

Data are recorded by the CLV system as usual in the area of the CD-ROM except the area for forming the character/graphic pattern therein. Here, when the copy disc of the CD-ROM is produced simply by the CLV system in order to duplicate the data of the original disc, the character/graphic pattern formed on the original disc of the CLV system by the CAV system is also duplicated by the CLV system. As a result, the character/graphic pattern recorded to be visible by the CAV system is drastically deformed to such an extent as to become invisible and seem nonexistent on the copy disc by the change of a linear velocity, likewise to the character/graphic pattern recorded on the CD-ROM of the foregoing first embodiment. It is difficult for only the area of the original disc based on the CAV system to be duplicated by the CAV system in order to produce the copy disc. The reason therefor is that the duplication is attended with the detection of the area of the original disc based on the CAV system, the detection of an angular velocity in the area based on the CAV system, and a rotation control and a write cycle control which are suited to the detected contents. Thus, according to the second embodiment, as in the foregoing first embodiment, whether or not the CD-ROM is the illegal copy disc can be visually identified depending upon the presence or absence of the exact character/graphic pattern, without the necessity of checking the played-back contents of the CD-ROM.

Figure 5:
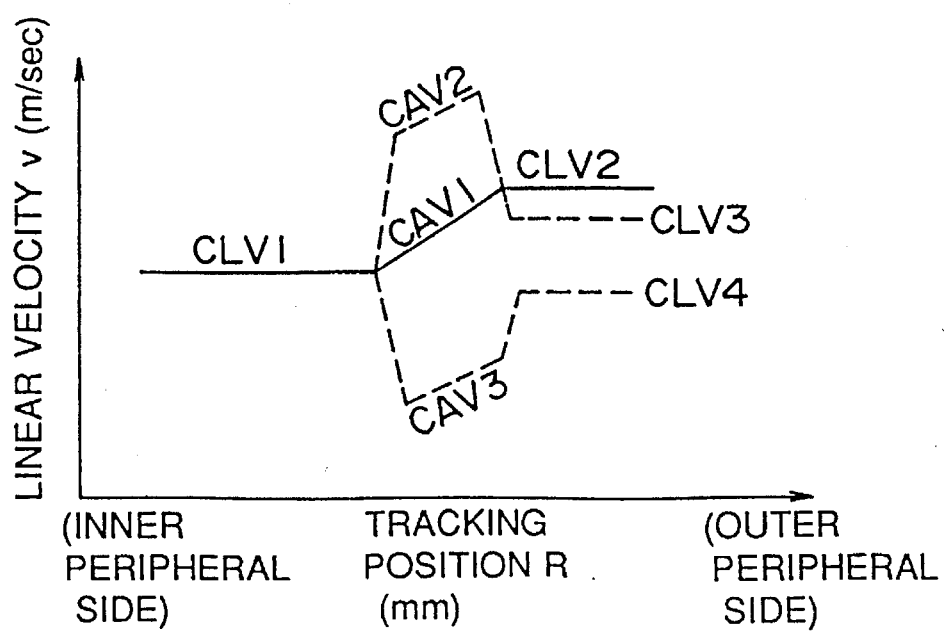
FIG. 5 is a graph showing the relationship between the radial track position and the linear velocity of a CD-ROM in the second embodiment of the present invention.

FIG. 5 illustrates the relationship of the linear velocity of the original disc in the second embodiment to the arrangement of the data recording area of this original disc based on the CLV system and the character/graphic pattern area thereof based on the CAV system. The axis of abscissas in the figure represents the distance (radius) R of the disc measured from the center of rotation thereof, while the axis of ordinates represents the tracking linear velocity v at which a track at the distance is traced.

Referring to FIG. 5, each part where the linear velocity v is constant is based on the CLV system, and each part where the linear velocity v increases from the inner periphery of the disc toward the outer periphery thereof is based on the CAV system.

As shown in the figure, a few methods are considered for inserting the part of the CAV system into the area of the CLV system. With the method which follows the parts CLV1-CAV1-CLV2 indicated by solid lines, the CLV area and the CAV area can be joined without the gap of the linear velocity. Therefore, the data can be recorded continuously and smoothly even at the boundary between both the areas. It is also facilitated to reproduce the data and to perform the rotational velocity control of the disc.

In contrast, with the method which follows the parts CLV1-CAV2-CLV3 or CLV1-CAV3-CLV4 indicated by broken lines, the tracking linear velocity v deviates or differs between the CLV area and the CAV area. Therefore, the rotational velocity of the disc needs to be rapidly changed at the boundary between both the areas. The same applies to the playback operation of the disc. Since, however, a great difference can be set between the tracking linear velocities of the CLV and CAV areas, the character/graphic pattern can be reliably extinguished on the copy disc. Moreover, as will be described later, whether a disc is the original disc or the copy disc can be discriminated depending upon the presence or absence of the CAV area in a playback system.

Contrariwise, a CD-ROM conforming to the CAV system may well be provided with an area in which pit patterns are formed by the CLV system so as to form a character/graphic pattern therein. Thus, similar effects can be brought forth.

Next, the third embodiment will be described.

In the third embodiment, a CD-ROM is provided with a plurality of areas for forming character/graphic patterns in accordance with the CAV system as shown in the second embodiment, and the angular velocities of the respective CAV areas are made different from one another. With this contrivance, the degree of difficulty copying is considerably increased in the case where the copy disc of the CD-ROM having the same areal configuration as that of the original disc thereof is to be produced by detecting the areas of the original disc based on the CAV system and detecting the angular velocities of the areas based on the CAV system. Therefore, the effect of preventing the illegal duplication can be further intensified.

Figure 6A:
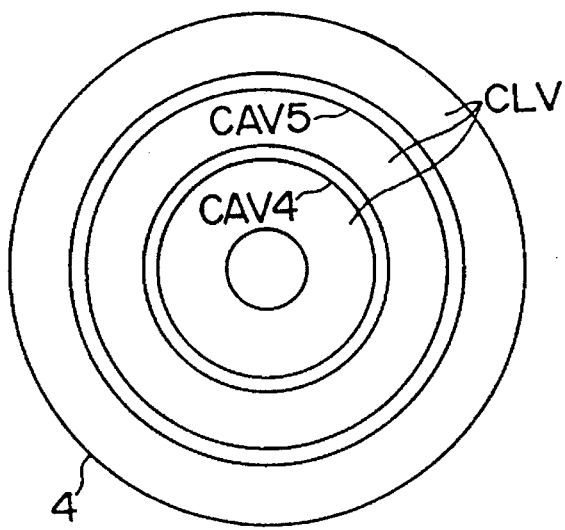
FIGS. 6A, 6B and 6C are diagrams each showing the layout and storage system of character/graphic pattern areas which are formed in a CD-ROM in the third embodiment of the present invention.
Figure 6B:
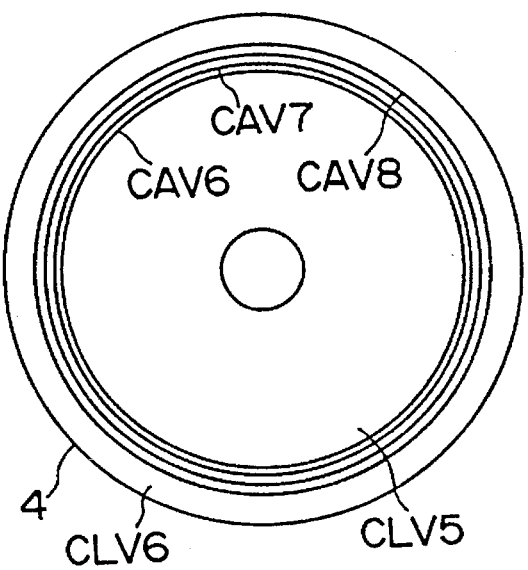
Figure 6C:
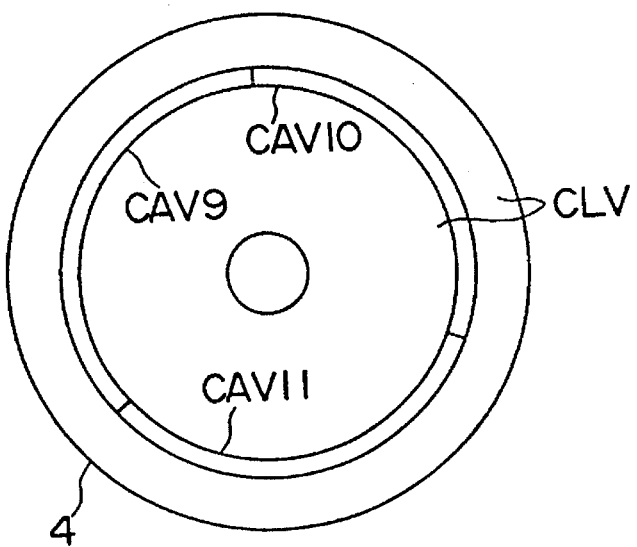

FIGS. 6A thru 6C are diagrams each showing the relationship between the layout of the plurality of CAV areas and the linear velocities thereof.

FIG. 6A illustrates a case where the plurality of CAV areas CAV4 and CAV5 are provided so as to be spaced in the radial direction of the disc 4. The linear velocities of the individual CAV areas and the CLV area of the disc 4 are connected as indicated by the solid lines or broken lines in FIG. 5.

Figure 7:
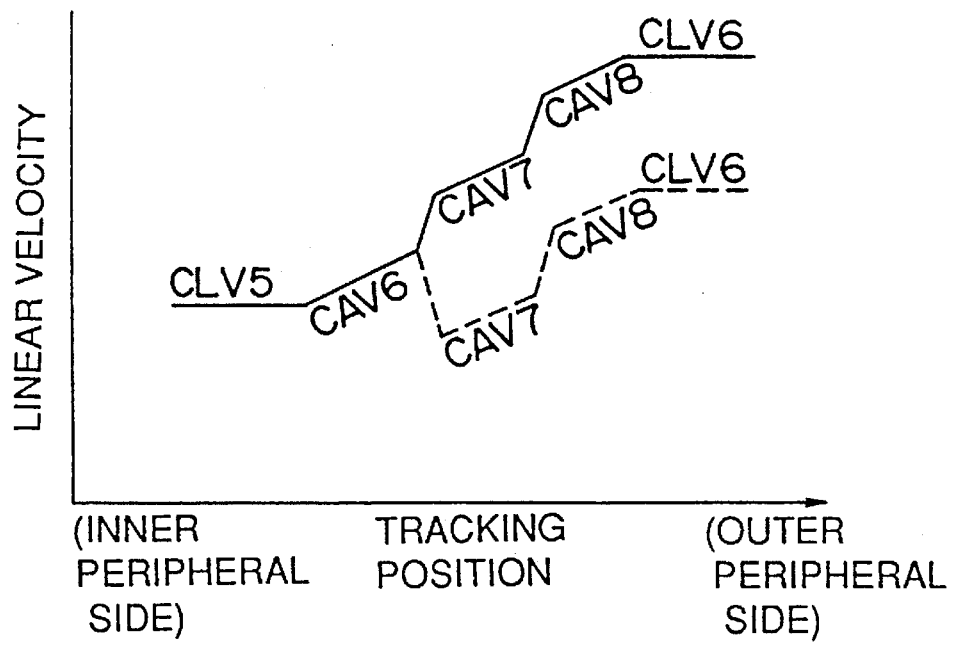
FIG. 7 is a graph showing the relationship between the radial track position and the linear velocity of the CD-ROM of the third embodiment as depicted in FIG. 6B.

FIG. 6B illustrates a case where the plurality of CAV areas CAV6 thru CAV8 are provided so as to adjoin one another in the radial direction of the disc 4. By way of example, the linear velocities of the CAV areas CAV6 thru CAV8 and the CLV areas CLV5 and CLV6 of the disc 4 are connected as indicated by solid lines or broken lines in FIG. 7.

Figure 8:
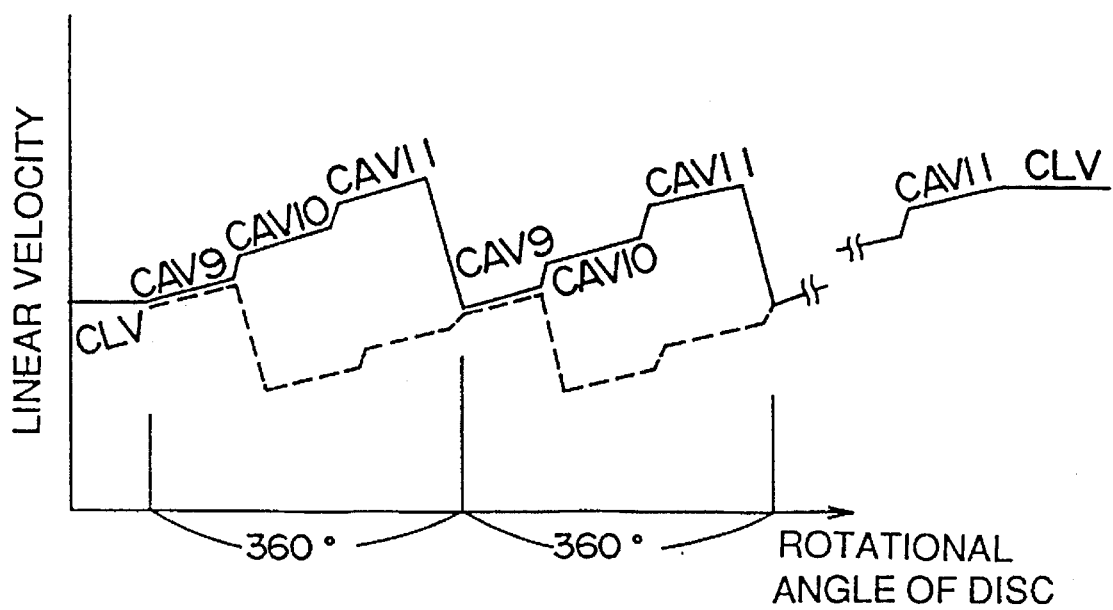
FIG. 8 is a graph showing the relationship between the radial track position and the linear velocity of the CD-ROM of the third embodiment as depicted in FIG. 6C.

FIG. 6C illustrates a case where the plurality of CAV areas CAV9 thru CAV11 are provided by partitioning an area of circular band shape in the circumferential direction of the disc 4. By way of example, the linear velocities of the CAV areas CAV9, CAV10 and CAV11 are connected as indicated by solid lines or broken lines in FIG. 8, so as to return to the initial linear velocities every revolution of the disc 4. Incidentally, the lengths (angles) of the individual CAV areas need not always be equal, and a CLV part can also be inserted between the adjacent CAV areas as occasion arises. Besides, in each of the examples shown in FIGS. 6A and 6B, the angular velocities of the individual CAV areas need not differ from each other, but CAV areas of identical angular velocity may well exist.

By the way, even in a case where the copy disc is produced by the CAV system from the original disc on which the character/graphic pattern is recorded to be visible in accordance with the CAV system, the character/graphic pattern becomes invisible on the copy disc unless it is duplicated at the same angular velocity as that of the original disc (at the deviation ratio of or below $1 \times 10^{-6}$). Therefore, even when the illegal CD-ROM bearing the character/graphic pattern similarly to the original disc is to be produced by detecting the position of each area of the original disc based on the CAV system and the angular velocity of each area based on the CAV system, the same difficulty as in the first embodiment is still involved.

Now, the fourth embodiment will be described.

In the fourth embodiment, an area for forming a character/graphic pattern in accordance with the CLV or CAV system is provided outside the data area (program area) of a CD-ROM, and the data recording capacity of the CD-ROM is additionally reserved to that extent.

Figure 9A:
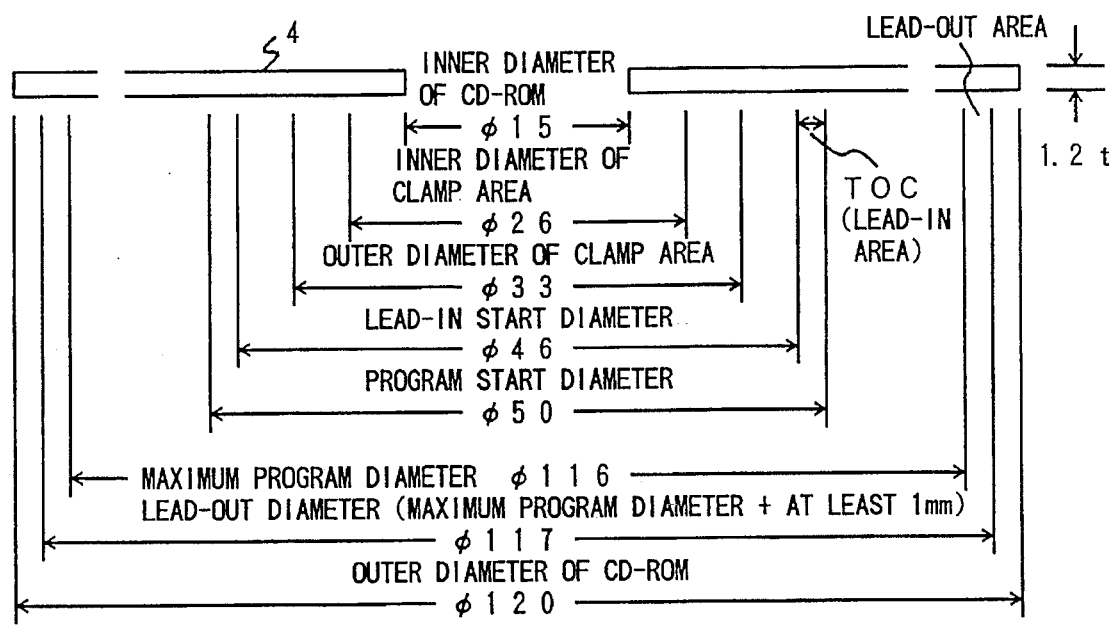
FIGS. 9A thru 9C are diagrams for explaining the arrangement of a character/graphic pattern area and a specular portion which are formed in a CD-ROM in the fourth embodiment of the present invention.

FIG. 9A is a sectional view showing the CD-ROM in this embodiment.

Referring to FIG. 9A, data are successively recorded from the position of a program start diameter ($\phi$50) toward the outer periphery of the CD-ROM 4 to, at most, a position which does not exceed the maximum program diameter ($\phi$116). Accordingly, in a case where the data are of small quantity, the outer diameter of the program area in which they are recorded lies inside the maximum program diameter, and it is called an "outer program diameter". In addition, a so-called "lead-out area" in which data "0's" are recorded is provided outside the outer program diameter.

Besides, a TOC (table of contents) area in which the index information items of the data stored in the program area are recorded is provided outside a lead-in start diameter, and it is also called a "lead-in area".

Figure 9C:
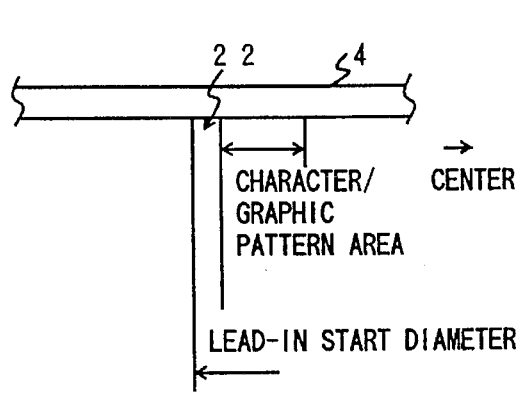
Figure 9B:
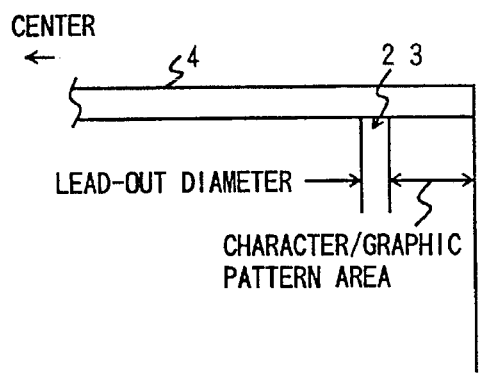

Usually, the inner side (22 in FIG. 9C) of the disc 4 with respect to the lead-in area and the outer side (23 in FIG. 9B) with respect to the lead-out area are both made of specular portions. Since the specular areas 22 and 23 have no pits, the optical pickup of a playback system can perform neither a focusing operation nor a tracking operation in these areas.

In this embodiment, the area for forming the character/graphic pattern in accordance with the CLV or CAV system is provided on, at least, either of the inner side of the lead-in area or the outer side of the lead-out area.

In the case of providing the pattern forming area outside the lead-out area, it is to be noted that, as seen from FIG. 9A, the outer side of a lead-out diameter ($\phi$117) is too narrow to bear the character/graphic pattern. In actuality, therefore, the outer program diameter may be set at $\phi$111 (111 [mm]) to provide the lead-out area inside the lead-out diameter ($\phi$117) anew, and the area for forming the character/graphic pattern may be provided outside the new lead-out area.

It is also allowed that the fine specular area (as shown at numeral 23 in FIG. 9B) is provided outside the lead-out area, and that the area for forming the character/graphic pattern is provided outside the specular area 23. Alternatively, it is also allowed that the fine specular area (as shown at numeral 22 in FIG. 9C) is provided inside the lead-in area, and that the area for forming the character/graphic pattern is provided inside the specular area 22.

A playback system in the prior art cannot perform a data reading operation after jumping over the specular portion provided outside the lead-out area. Accordingly, when the specular portion (23 in FIG. 9B) is provided, the data of the character/graphic pattern formed outside this specular portion are not read out. Consequently, the data of the character/graphic pattern are not recorded on the copy disc. As will be described later, therefore, whether the pertinent CD-ROM is the original disc or the copy disc can be identified in such a way that the presence or absence of the character/graphic pattern is decided on the basis of data reproduced from the pattern forming area, in the playback operation of the CD-ROM in the playback system according to the present invention.

Now, the fifth embodiment will be described.

The fifth embodiment concerns the aforementioned playback system which plays back the CD-ROM of the fourth embodiment.

Figure 10:
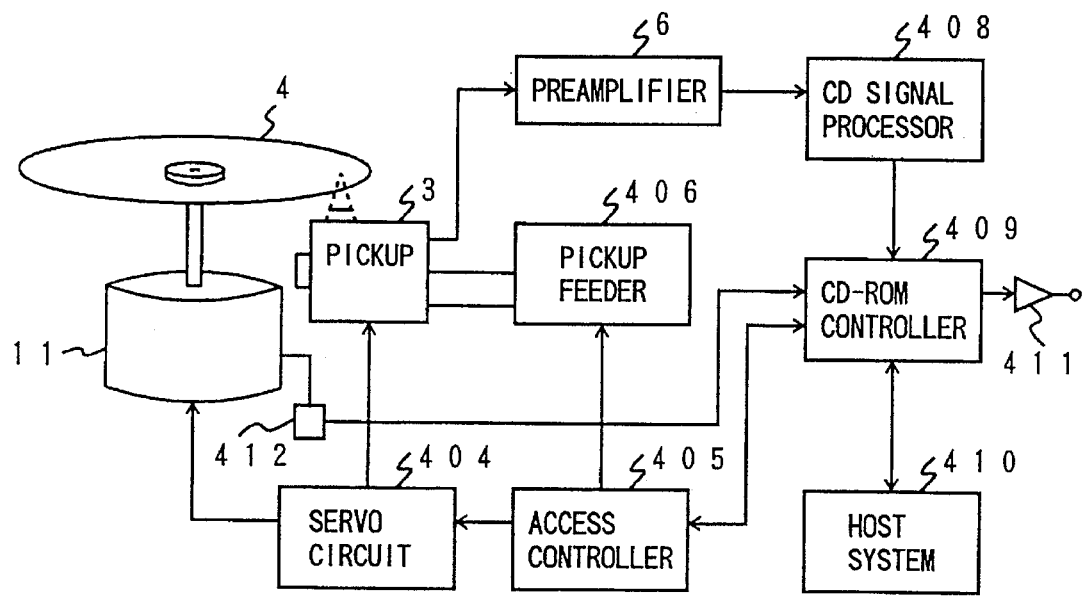
FIG. 10 is a block diagram showing the circuit arrangement of a playback system in the fifth embodiment of the present invention.

FIG. 10 illustrates the circuit arrangement of the playback system in the fifth embodiment.

Referring to the figure, a playback signal read out of the CD-ROM 4 by an optical pickup 3 is amplified and waveform-equalized by a preamplifier 6. The resulting signal is subjected to EFM (eight-to-fourteen modulation) demodulation by a CD digital signal processor 408, and the demodulated data are sent to a CD-ROM controller 409. After correcting any error in the received data and restoring the corrected data to the original data array, the CD-ROM controller 409 sends the resulting data to a host system 410. Here, channel bit patterns recorded on the CD-ROM 4 have been actually obtained by subjecting scrambled data strings and error correction codes to the EFM. However, channel bit patterns for forming the character/graphic pattern need not always be created by scrambling data, but they may well be created directly as the channel bit patterns which are to be recorded on the CD-ROM 4. By the way, in a case where the character/graphic pattern is to be formed by the pit patterns of channel bit patterns obtained through the EFM of scrambled data strings and error correction codes, the original data strings are created in consideration of the contents of the scrambling.

Here, the playback system of this embodiment is also available for a CD for musical use. In the case of playing back the musical CD, the CD-ROM controller 409 supplies the restored data to a D/A (digital-to-analog conversion) circuit 411. The D/A circuit 411 converts the supplied data into an analog signal, which is delivered as an output.

Besides, in compliance with an access command from the host system 410, the CD-ROM controller 409 controls the servo operation of a servo circuit 404 for a disc motor 11 and the movement operation of a pickup feeder 406 for the optical pickup 3 through an access controller 405. Numeral 412 designates a rotational speed detector which will be explained in detail later.

In such a playback system, the rotational servo control of the disc motor 11 is performed by the servo circuit 404 as stated below.

Figure 11:
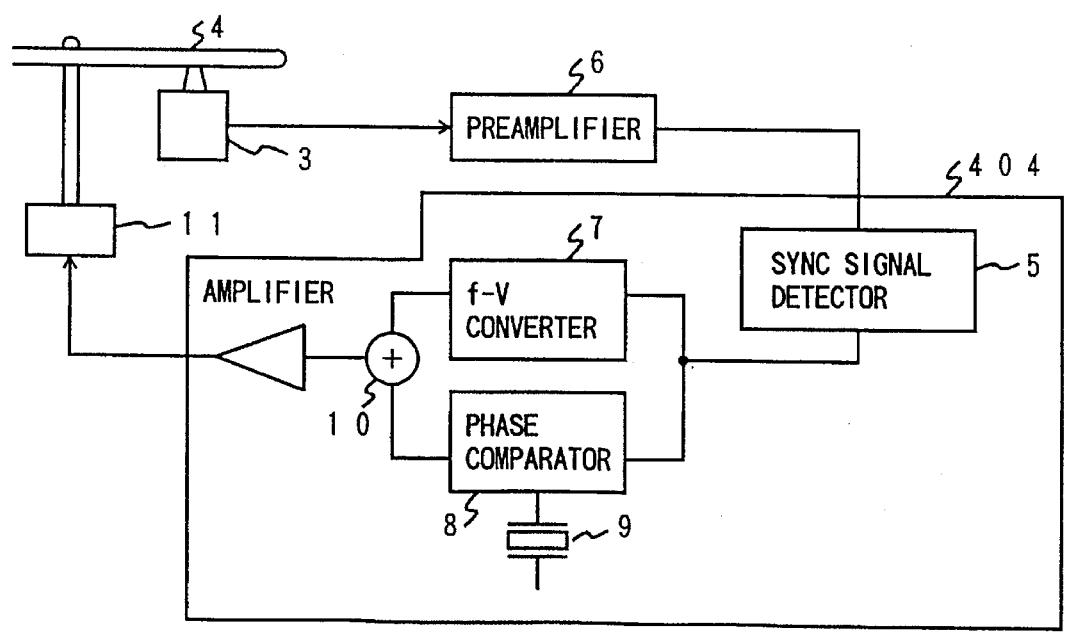
FIG. 11 is a block diagram showing the circuit arrangement of the rotating servo loop of a servo circuit which is included in the playback system of the fifth embodiment.

FIG. 11 illustrates the circuit arrangement of the rotational servo loop of the servo circuit 404.

A sync signal detector 5 extracts the sync signal explained before, from the playback signal amplified and waveform-equalized by the preamplifier 6. An f-V (frequency-to-voltage) converter 7 converts the extracted sync signal into a voltage which is proportional to the frequency of the sync signal. A phase comparator 8 makes the phase comparison between the frequency of the sync signal and the oscillation frequency (reference frequency) of a crystal oscillator 9 and sends an adder circuit 10 an error signal proportional to the phase shift between the sync signal and the oscillation frequency, thereby correcting the output of the f-V converter 7. The output of the adder circuit 10 is amplified appropriately and is sent to the disc motor 11 so as to control the rotational frequency thereof. Besides, the actual rotational speed of the disc motor 11 is detected by the rotational speed detector 412, and the detected value of the rotational speed is sent to the CD-ROM controller 409. The rotational speed detector 412 can be implemented by a tacho-generator or encoder which is attached to the disc motor 11.

Owing to such a circuit arrangement, the disc motor 11 has its rotational frequency controlled in order that the frequency of the sync signal may be held constant. Here, if the frequency of the sync signal read out of the CAV area of the disc 4 falls within the pull-in range of the phase comparator 8, the rotational frequency of the disc motor 11 can be controlled so as to hold the sync signal frequency constant, irrespective of whether the disc 4 conforms to the CLV system or the CAV system.

As a result, in the case of the CLV system, the rotational speed of the disc motor 11 is controlled so as to lower from the inner periphery of the disc 4 toward the outer periphery thereof, whereby the linear velocity of each track is held constant. Besides, in the case of the CAV system, the rotational speed of the disc motor 11 is controlled so as to be constant at all times. Here, the angular velocity which is used in the CAV system is set in consideration of the pull-in range of the phase comparator 8 so that the playback system of this embodiment can also play back the area provided in the CD-ROM of the CLV system and formed with the character/graphic pattern by the CAV system in each of the second, third and fourth embodiments.

In producing the disc 4 of the fourth embodiment (FIGS. 9A–9C), identification information indicating whether the disc 4 is the musical CD or the CD-ROM is recorded as the TOC (table of contents) information on this disc. Besides, a predetermined password indicating the regular or legal supplier or distributor of the CD-ROM is stored in an area (such as a system area) which is stipulated by the volume and file structure of the CD-ROM for program JIS (Japanese Industrial Standard) information interchange (JIS X0606-1990, ISO 9660) as are recorded next to the TOC information. The password may well be enciphered and then stored.

On the other hand, the password used by the regular supplier of the CD-ROM 4 of the fourth embodiment, and information on the position of the character/graphic pattern bearing area of the CD-ROM 4 offered by the regular supplier are stored beforehand in a memory which is included in the CD-ROM controller 409 of the playback system. The positional information indicates, for example, the distance of the character/graphic pattern bearing area from the lead-out area.

In the case where the password is enciphered and then stored in the CD-ROM 4, the CD-ROM controller 409 is furnished with means for deciphering the enciphered password.

The playback system of this embodiment shown in FIGS. 10 and 11 detects the presence or absence of the character/graphic pattern bearing area provided outside the lead-out area, thereby deciding whether the CD-ROM 4 about to be played back is the legal original disc or the illegal copy disc. Incidentally, the character/graphic pattern may be formed by either the CLV system or the CAV system.

Figure 12:
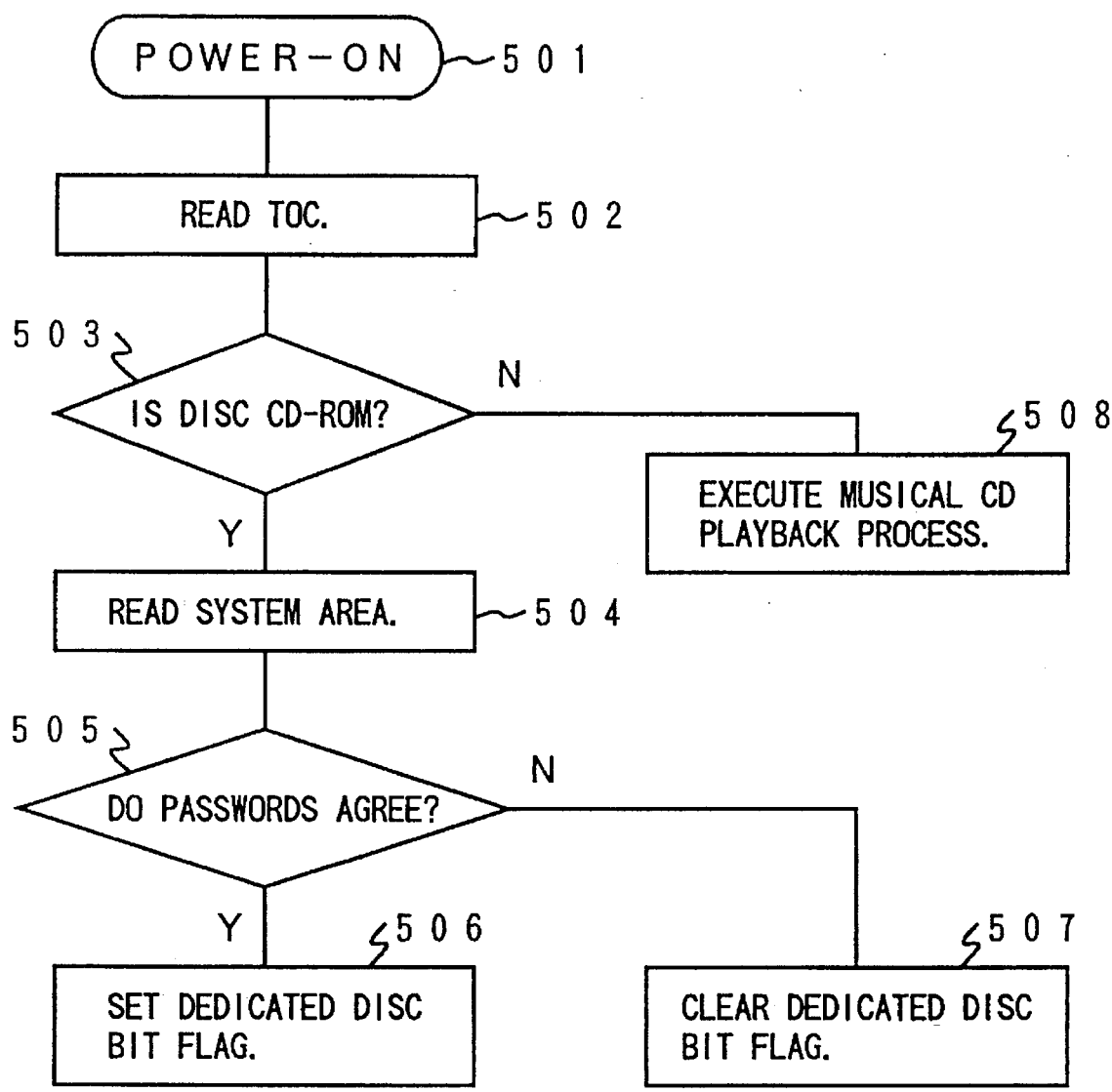
FIG. 12 is a flow chart showing the steps of a process which is executed by a CD-ROM controller included in the playback system of the fifth embodiment.
Figure 13:
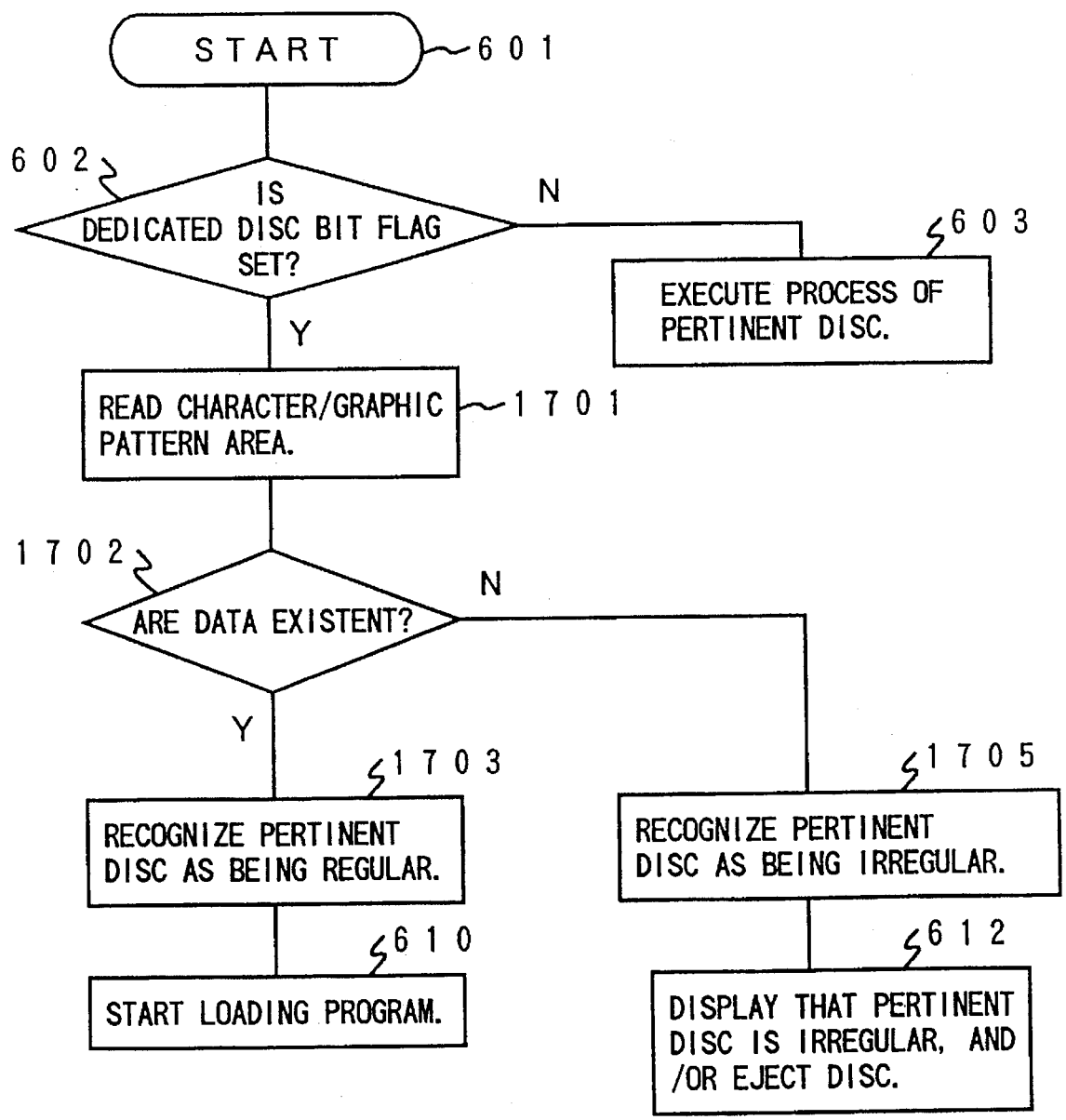
FIG. 13 is a flow chart showing the steps of another process which is executed by the CD-ROM controller included in the playback system of the fifth embodiment.

FIGS. 12 and 13 illustrate a playback process which is performed by the playback system.

When a new disc is mounted, the CD-ROM controller 409 of the playback system executes a process as shown in FIG. 12.

At a step 502 subsequent to a step 501 at which the power of the playback system is turned ON, the CD-ROM controller 409 reads out the TOC (table of contents) information of the pertinent disc to check the lead-out position. At a step 503, it decides whether the pertinent disc is a musical CD or a CD-ROM. In the case of the musical CD, the CD-ROM controller 409 supplies reproduced data to the D/A circuit 411 so as to execute a playback process for the musical CD at a step 508.

In the case of the CD-ROM, the flow of the process shifts to a step 504. At this step, the CD-ROM controller 409 searches for the password of the supplier of the CD-ROM by reading the contents of an area (such as a system area) stipulated by the volume and file structure of the CD-ROM for program JIS information interchange (JIS X0606-1990, ISO 9660) as are recorded next to the TOC information. At a step 505, the CD-ROM controller 409 checks if the password searched for agrees with a password stored in the memory of this controller 409. When the passwords agree, the flow of the process shifts to a step 506 at which a dedicated disc bit flag is set, whereupon the process is ended. On the other hand, when the passwords disagree at the step 505, the flow of the process shifts to a step 507 at which the dedicated bit flag is cleared, whereupon the process is ended.

When the process shown in FIG. 12 has ended, the CD-ROM controller 409 subsequently executes a process shown in FIG. 13. However, in the case where it has been decided that the mounted disc is the musical CD, at the step 503, the process shown in FIG. 13 is not executed.

This process is started at a step 601. At a step 602, the CD-ROM controller 409 decides if the dedicated disc bit flag is set. On condition that the flag is set, the flow of the process shifts to steps 1701 et seq. In contrast, on condition that the flag is cleared, a process corresponding to the contents of the pertinent disc is executed in the same manner as in the prior art at a step 603. Alternatively, in the case where the dedicated disc bit flag is cleared, that is, where the passwords do not agree, the disc can be made unavailable by an expedient such as the ejection thereof.

At the step 1701, the CD-ROM controller 409 reads out the character/graphic pattern bearing area of the disc with reference to the information on the position of this area as has been stored in the internal memory beforehand. On this occasion, even when the specular area exists inside the character/graphic pattern bearing area, the controller 409 is adapted to read out the pattern area beyond the specular area. Further, at the step 1702, the CD-ROM controller 409 decides whether or not data are existent in the character/graphic pattern bearing area. When the data exist, the pertinent disc is recognized as a regular CD-ROM at the step 1703. Thereafter, the CD-ROM is played back, and playback data are sent to the host system 410 (step 610).

On the other hand, in a case where the data do not exist in the character/graphic pattern bearing area, the pertinent disc is recognized as an irregular CD-ROM at the step 1705. Then, the irregular CD-ROM is made unavailable (step 612) by presenting the display that the pertinent CD-ROM is a copy disc, by ejecting the pertinent CD-ROM or/and by suspending the playback operation of the playback system. Owing to such a process, the copy disc produced by fully duplicating the original disc of the CD-ROM cannot be utilized by the playback system.

By the way, in an ordinary playback system, a readout operation is not performed beyond the lead-out position found at the step 502 in FIG. 12.

Now, the sixth embodiment will be described.

The sixth embodiment concerns a playback system for playing back the CD-ROM of the second or third embodiment, or the CD-ROM which is formed with the character/graphic pattern by the CAV system in the fourth embodiment.

That is, the sixth embodiment is directed toward the CD-ROM in which the character/graphic pattern is formed by the CAV system.

The circuit arrangement of the playback system in this embodiment is the same as that of the playback system in the fifth embodiment as shown in FIGS. 10 and 11. The sixth embodiment, however, features deciding whether or not the character/graphic pattern is recorded by the CAV system. In general, it is difficult to produce a copy disc from an original disc in which the CLV system and the CAV system are coexistent. In this embodiment, therefore, any disc is decided as the original disc in a case where the character/graphic pattern is recorded by the CAV system.

Figure 14:
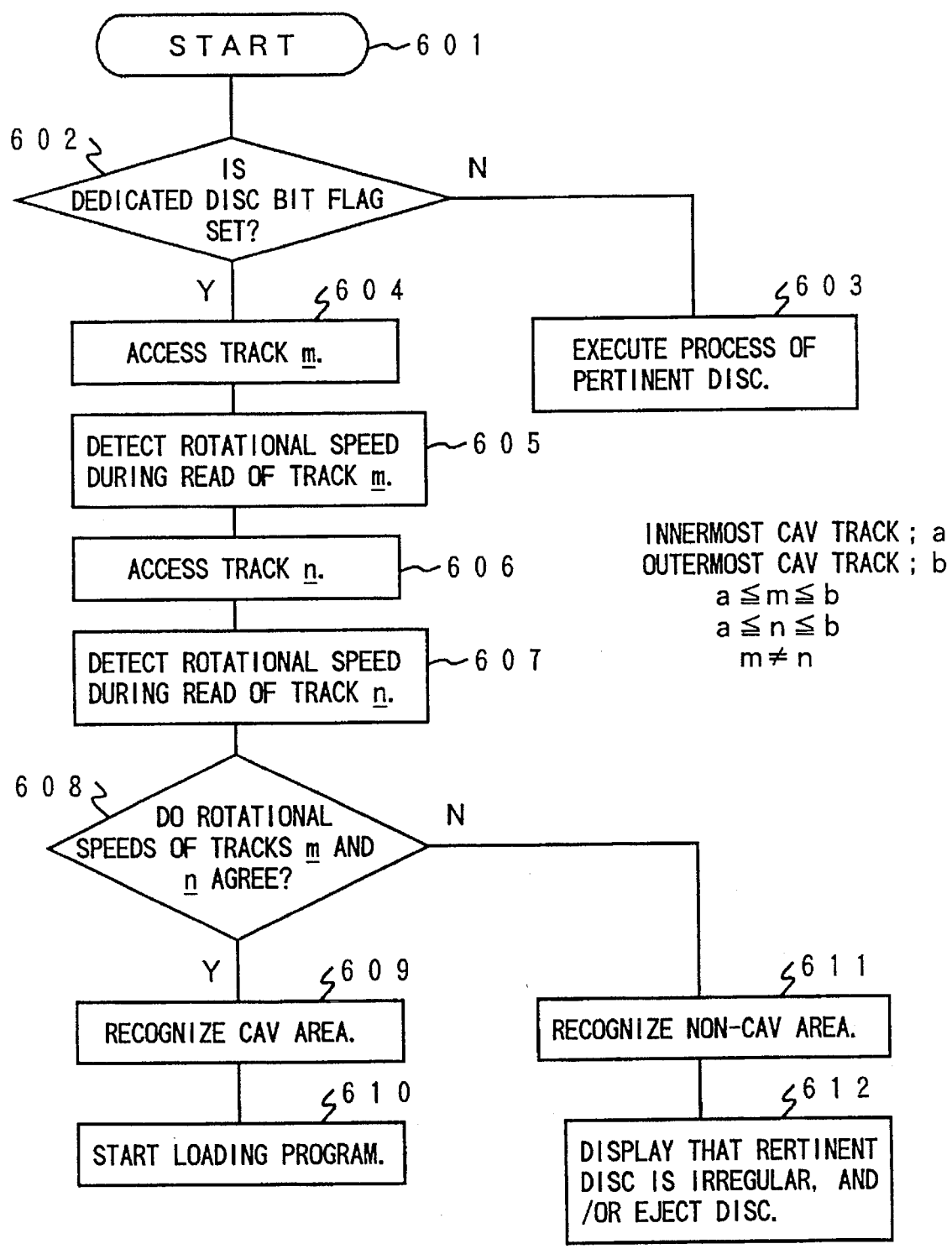
FIG. 14 is a flow chart showing the steps of a process which is executed by a CD-ROM controller included in a playback system in the sixth embodiment of the present invention.

For this purpose, when the process shown in FIG. 12 has ended, the CD-ROM controller 409 subsequently executes a process shown in FIG. 14, instead of the process shown in FIG. 13. However, in the case it has been decided that where the mounted disc is the musical CD at the step 503, the process shown in FIG. 14 is not executed.

This process is started at a step 601. At a step 602, the CD-ROM controller 409 decides if the dedicated disc bit flag is set. On condition that the flag is set, the flow of the process shifts to steps 604 et seq. In contrast, on condition that the flag is cleared, a process corresponding to the contents of the pertinent disc is executed in the same manner as in the prior art at a step 603.

At the step 604, the CD-ROM controller 409 accesses a track m included in the character/graphic pattern bearing area of the disc, with reference to the information on the position of this area as has been stored in the internal memory beforehand. At the next step 605, the CD-ROM controller 409 detects the rotational speed of the disc during the read of the track m, through the rotational speed detector 412.

Incidentally, the rotational speed can also be detected by measuring a time period which is required for one revolution of the disc. This time period is found by controlling the optical pickup 3 so as to jump backwards by one track (so as to continue the tracking of an identical track) midway through one revolution, and then measuring a time interval elapsed from the reproduction timing of a certain specified data pattern till the next reproduction timing thereof. In this case, a data pattern corresponding to the featuring part of the character/graphic pattern can be employed as the specified data pattern. In the case where the rotational speed is detected in this way, the data pattern of the featuring part should preferably be stored in the memory of the CD-ROM controller 409 within the playback system in association with the stored password of the disc.

Subsequently, any track n different from the track m is accessed within the character/graphic pattern bearing area at the step 606, and the rotational speed of the disc during the read of the track n is similarly detected at the step 607.

At the step 608, the rotational speeds of the tracks m and n are compared. If they agree, the flow of the process proceeds to the step 609 at which the pertinent disc is decided as the regular CD-ROM (original disc) formed with the character/graphic pattern by the CAV system. At the next step 610, the CD-ROM is played back, and reproduced data is sent to the host system 410.

On the other hand, in a case where the rotational speeds of the tracks m and n disagree, the pertinent CD-ROM is made unavailable by presenting the display that the pertinent CD-ROM is a copy disc, by ejecting the pertinent CD-ROM or/and by suspending the playback operation of the playback system (steps 611 and 612). Owing to such a process, the copy disc produced by fully duplicating in accordance with the CLV system the original disc which is formed with the character/graphic pattern by the CAV system cannot be utilized by the playback system.

In the above process, the tracks m and n should desirably be at positions which are as far as possible from each other within the area of the character/graphic pattern. The reason therefor is that the agreement or disagreement of the rotational speeds can be more reliably decided.

Besides, the number of tracks to have their rotational speeds detected may well be set larger than two, so as to render the decision more reliably. By way of example, it is also allowed to detect the rotational speeds of all tracks included in the area of the character/graphic pattern and to find the agreement or disagreement of all the detected rotational speeds.

Now, the seventh embodiment of the present invention will be described.

This embodiment concerns a playback system in which a copy disc is decided on the basis of the values of data corresponding to the constituent pit patterns of a character/graphic pattern.

The circuit arrangement of the playback system in this embodiment is the same as that of the playback system in the fifth embodiment as shown in FIGS. 10 and 11. In the seventh embodiment, however, a data pattern obtained by reproducing the character/graphic pattern bearing area of a disc is stored as a collating data pattern in the memory of the CD-ROM controller 409 beforehand. In addition, when the process shown in FIG. 12 has ended, the CD-ROM controller 409 subsequently executes a process shown in FIG. 15, instead of the process shown in FIG. 13. However, in the case where it has been decided that the mounted disc is the musical CD at the step 503, the process shown in FIG. 15 is not executed.

Figure 15:
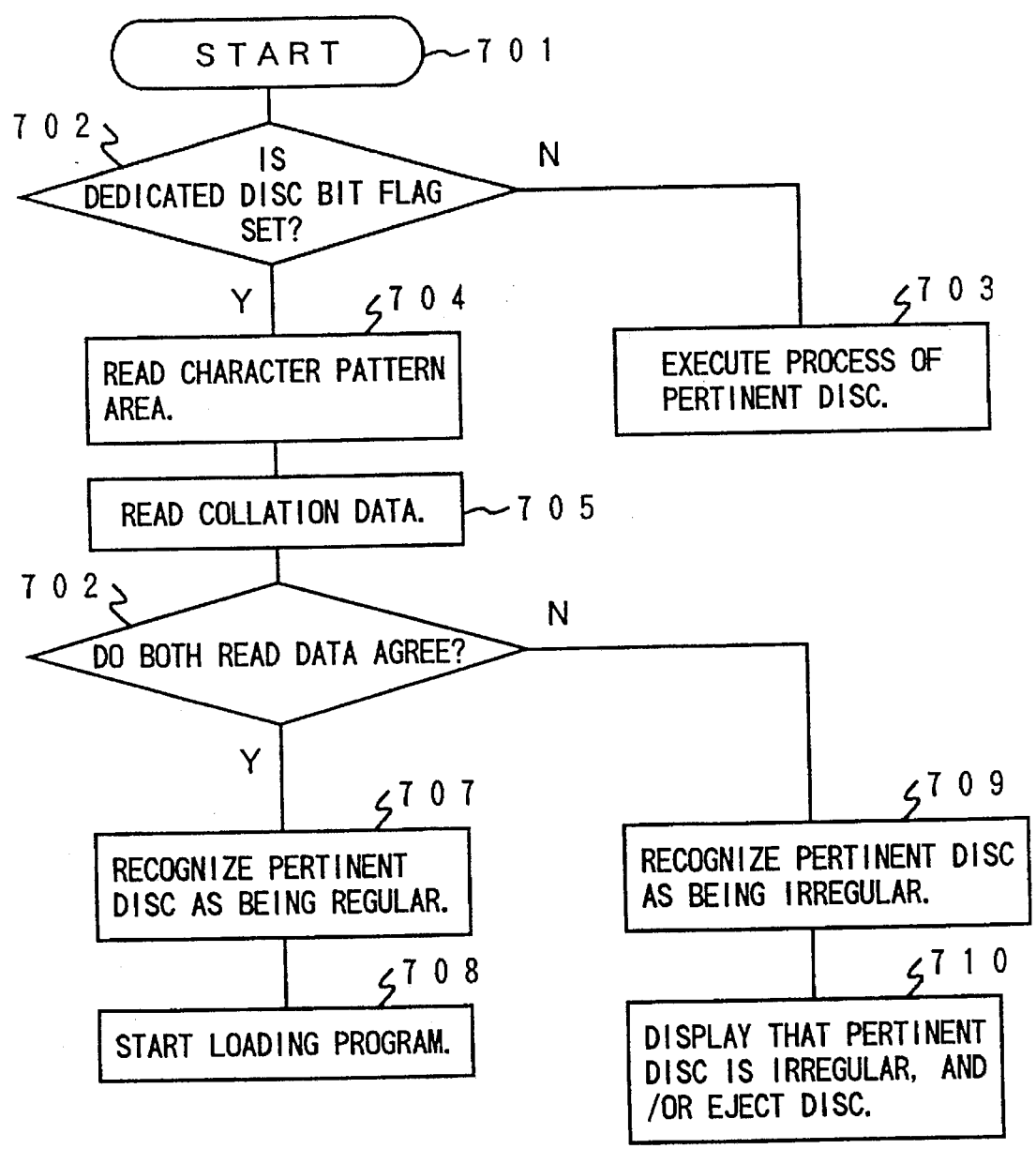
FIG. 15 is a flow chart showing the steps of a process which is executed by a CD-ROM controller included in a playback system in the seventh embodiment of the present invention.

The process shown in FIG. 15 is started at a step 701. At a step 702, the CD-ROM controller 409 decides if the dedicated disc bit flag is set. On condition that the flag is set, the flow of the process shifts to steps 704 et seq. In contrast, on condition that the flag is cleared, a process corresponding to the contents of the pertinent disc is executed in the same manner as in the prior art at a step 703.

At the step 704, the CD-ROM controller 409 reads out the data of the character/graphic pattern bearing area with reference to the information on the position of this area as has been stored in the internal memory beforehand. Subsequently, the collating data pattern stored in the internal memory beforehand is read out at the step 705, and the pattern of the data read out at the step 704 and the data pattern read out at the step 705 are collated at the step 706. When the collation results in agreement, the pertinent disc is recognized as an original disc at the step 707. At the next step 708, the CD-ROM is played back, and playback data are sent to the host system 410.

On the other hand, in a case where the collated patterns disagree, the pertinent CD-ROM is made unavailable by presenting the display that the pertinent CD-ROM is the copy disc, by ejecting the pertinent CD-ROM and/or by suspending the playback operation of the playback system (steps 709 and 710).

Owing to such a process, the copy disc being the CD-ROM which is formed with the character/graphic pattern by an expedient such as printing, in order to look like the original disc, can be made unavailable in the playback system.

In the above process, the collating data pattern which is stored in the memory of the CD-ROM controller 409 beforehand need not always be set as the whole data pattern obtained by reproducing the character/graphic pattern bearing area of the CD-ROM, but it may well consist of only a data pattern corresponding to a featuring part in the character/graphic pattern.

Figure 16:
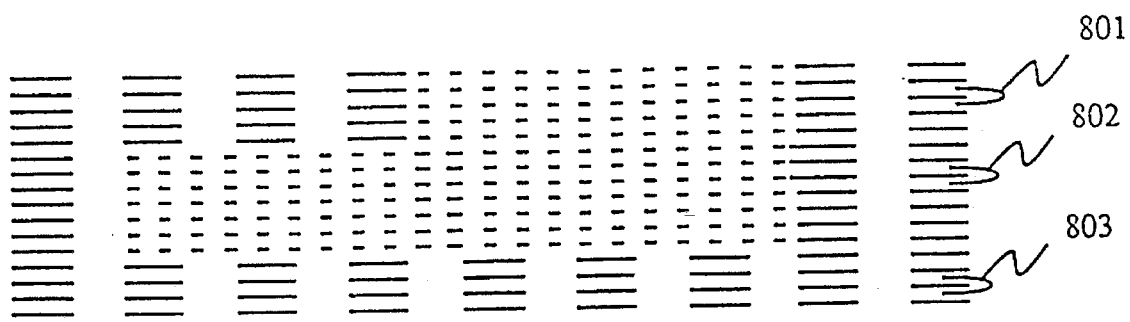
FIG. 16 is a diagram showing an example of that featuring part of a character/graphic pattern which is used for collation by the CD-ROM controller included in the playback system in the seventh embodiment.

By way of example, only the data pattern corresponding to the featuring part of the character/graphic pattern as shown in FIG. 16 may well be stored so as to collate it for the decision of the mounted disc.

In the example shown in FIG. 16, the data pattern corresponding to the feature of the character/graphic pattern can be obtained by reading out only the contents of tracks 801, 802 and 803.

Moreover, since the pattern of data for the whole circumferences of the tracks 801 to 803 is not required for the collation of the feature, only the sectors of these tracks corresponding to the featuring part of the character/graphic pattern may well be read out and collated. Here, one sector is composed of a predetermined number of frames, and each sector is endowed with a sector No. for identifying it. In this case, the track Nos. and sector Nos. of the tracks 801, 802 and 803 required for accessing the sectors corresponding to the featuring part of the character/graphic pattern are stored in the memory of the CD-ROM controller 409 beforehand.

Incidentally, the data pattern to be stored in the memory of the CD-ROM controller 409 beforehand may well be enciphered or encoded so as to reduce a necessary memory capacity.

In the above, the optical discs and the playback systems embodying the present invention have been described as to the cases where the information recording media are CD-ROM's.

However, the foregoing embodiments are not restricted to CD-ROM's, but they are similarly applicable also to other information recording media on which information are recorded by affording optical features thereto, for example, CD's, minidiscs, optical discs and magnetooptic discs. Moreover, they are applicable even to non-disc type information recording media, for example, optical memory cards.

Here, applications to the optical memory cards will be exemplified.

FIGS. 17A thru 17D illustrate the principles of recording/reproduction systems for the optical memory cards.

Figure 17A:
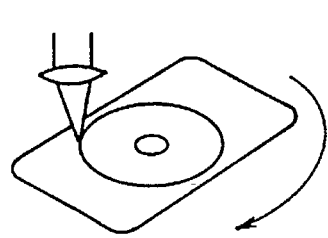
FIGS. 17A thru 17D are schematic perspective views each showing the record/playback system of an optical memory card.
Figure 17B:
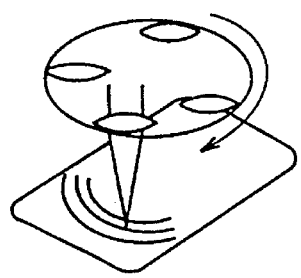
Figure 17C:
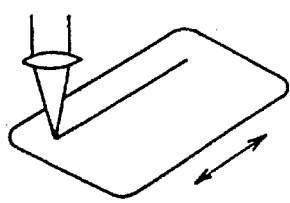
Figure 17D:
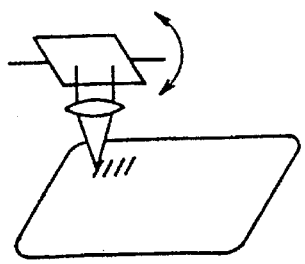
Figure 18:
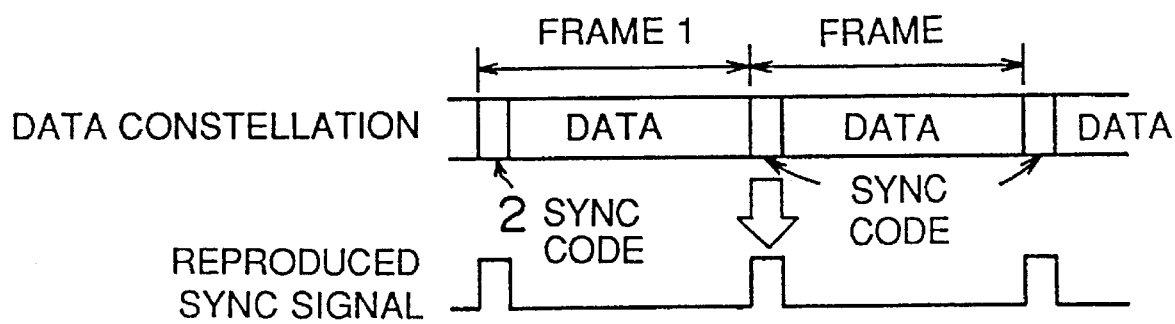
FIG. 18 is a diagram showing frames which are recorded on a CD-ROM.

The recording/reproduction systems for the optical memory cards include a card rotation type shown in FIG. 17A, a head rotation type shown in FIG. 17B, a card reciprocation type shown in FIG. 17C, and a beam scan type shown in FIG. 17D.

The optical memory cards of the card rotation type and the head rotation type are essentially the same as the CD-ROM's except for the different shapes of the storage media. Accordingly, the foregoing embodiments can be directly applied to these systems.

In addition, the optical memory cards of the card reciprocation type and the beam scan type can be formed with character/graphic patterns which are difficult to reproduce by duplication, in terms of pit patterns corresponding to data.

The embodiments of the present invention have been described above.

As thus far described, the embodiments of the present invention can realize optical discs, such as CD-ROM's, which are formed with visible character/graphic patterns concerning trademarks and copyrights.

Moreover, when the copy disc of such an optical disc is produced from the original disc thereof, the character/ graphic pattern becomes distorted or invisible. That is, the copy disc is immediately identified by sight. Therefore, the effect of suppressing the illegal duplication of the optical disc can be expected.

Further, the distortion or invisible part of the character/graphic pattern of the copy disc of the optical disc can be brought about by dividing an area for recording the character/graphic pattern. Still further, the character/graphic pattern can be recorded without spoiling the information recording capacity of the optical disc, in such a way that the divisional parts thereof are respectively recorded in the outer peripheral portion of the information recording optical disc with respect to the outer program diameter thereof and in the inner peripheral portion of the same with respect to the lead-in start diameter thereof.

Furthermore, when a password is recorded on the optical disc, a playback system identifies the copy disc on the basis of the password and the information of the character/graphic pattern area and makes this copy disc unavailable.

The playback system identifies the copy disc when the character/graphic pattern bearing area is not recorded by the CAV system, on the basis of a tracking linear velocity, and it makes this copy disc unavailable. Also, it identifies the copy disc by checking data read out of the character/graphic pattern bearing area, and it makes this copy disc unavailable.

By the way, dedicated playback systems are usually used in the field of CD-ROM publications of games, dictionaries etc. In this regard, when any of the playback systems in the embodiments is applied to such a dedicated playback system, an optical disc produced by illegal duplication cannot be utilized. The playback system of the embodiment is therefore expected to demonstrate the effect of suppressing the prevalence of illegal optical disc copies of a regular optical disc.

In addition, when similar character/graphic patterns are recorded on optical memory cards of various types, the same effects as in the case of the optical discs can be brought forth.

As described above, according to the present invention, it is possible to offer an information recording medium whose master disc can be prepared by a manufacturing process similar to that of the prior art, and which is formed with a visible pattern that is very difficult to reproduce by duplication.

It is also possible to offer a playback system which refuses to utilize any information recording medium produced by duplicating the aforementioned information recording medium of the present invention.

What is claimed is:

1. An information recording medium comprising:

a record surface for recording data in term of pit patterns formed on a plurality of tracks of the record surface and corresponding to data to-be-read by a playback system;

a pattern displaying area of the record surface area extending over specified tracks, for presenting either of a character pattern or a graphic pattern having a visible size;

wherein in areas included in said pattern displaying area on said specified tracks, specified pit patterns having substantially a first average optical reflectance are formed, said first average optical reflectance of said specified pit patterns differing, to a visually perceptible extent from a second average reflectance of pit patterns formed in areas, on tracks, adjoining said pattern displaying area, and wherein said specified patterns are pit patterns readable by said playback system as data.

2. An information recording medium comprising:

a record surface for recording information in terms of pit patterns formed on a plurality of tracks of the record surface and corresponding to data to-be-read by a playback system;

a pattern displaying area of the record surface extending over specified tracks, for presenting either of a character pattern or a graphic pattern having a visible size; and an indication area of the record surface containing said pattern displaying area therein;

wherein in areas included in said pattern displaying are on said specified tracks, specified pit patterns having substantially a first average optical reflectances are formed, said first average optical reflectances of said specified pit patterns differing, to a visually perceptible extent, from a second average reflectance of pit patterns formed in areas, on tracks, included in said indication area and not included in said pattern displaying area, borders of the second average optical reflectance indicating an outline of said character pattern or said graphic pattern having a visible size, and said specified pit patterns being pit patterns readable by said playback system as data.

3. An optical disc comprising:

a record surface for recording information in terms of pit patterns formed on a plurality of tracks of the record surface and corresponding to data to-be-read by a playback system;

a pattern displaying area of the record surface extending over specified tracks, for presenting either of a character pattern or a graphic pattern having a visible size;

wherein in areas included in said pattern displaying area on said specified tracks, specified pit patterns having substantially a first average optical reflectance are formed, said first average optical reflectance of said specified pit patterns differing, to a visually perceptible extent, from a second average reflectance of pit patterns formed in areas, on tracks, adjoining said pattern displaying area, borders of the second average optical reflectance indicating an outline of said character pattern or said graphic pattern having a visible size, and wherein said specified pit patterns are pit patterns readable by said playback system as data.

4. An optical disc as defined in claim 3, wherein a plurality of said pattern displaying areas are arranged in areas provided on said record surface of said optical disc.

5. An optical disc as defined in 3, wherein the pit patterns formed in a bounds of tracks containing said specified tracks are formed in accordance with a CAV (constant angular velocity) system in which a rotational velocity of said optical disc is held constant, and the pit patterns formed on any tracks of said record surface except tracks contained in said bounds are formed in accordance with a CLV (constant linear velocity) system in which a tracking linear velocity of said tracks is held constant.

6. An optical disc as defined in claim 5, wherein among the tracks included in the areas formed with the pit patterns in accordance with said CAV system, the tracks adjoining the areas formed with the pit patterns in accordance with said CLV system have the pits thereof formed in a unit length which is substantially equal to that of pits formed in the tracks of the adjacent areas.

7. An optical disc as defined in claim 6, wherein said plurality of pattern displaying areas are arranged in a plurality of annular areas which are separated from each other.

8. An optical disc as defined in claim 6, wherein said plurality of pattern displaying areas are arranged in a plurality of annular areas which adjoin in succession.

9. An optical disc as defined in claim 6, wherein said plurality of pattern displaying areas are arranged in a plurality of areas which are obtained by dividing an annular record area circumferentially of said optical disc, said annular record area being provided on said record surface of said optical disc.

10. An optical disc as defined in claim 3, wherein the pit patterns formed in a bounds of tracks containing said specified tracks are formed in accordance with a CLV (constant linear velocity) system in which a tracking linear velocity of said tracks is held constant, and the pit patterns formed on any tracks of said record surface except tracks contained in said bounds are formed in accordance with a CAV (constant angular velocity) system in which a rotational velocity of said optical disc is held constant.

11. An optical disc as defined in claim 10, wherein among the tracks included in the areas formed with the pit patterns in accordance with said CAV system, the tracks adjoining the areas formed with the pit patterns in accordance with said CLV system have the pits thereof formed in a unit length which is substantially equal to that of pits formed in the tracks of the adjacent areas.

12. An optical disc as defined in claim 11, wherein said plurality of pattern displaying areas are arranged in a plurality of annular areas which are separated from each other.

13. An optical disc as defined in claim 11, wherein said plurality of pattern displaying areas are arranged in a plurality of annular areas which adjoin in succession.

14. An optical disc as defined in claim 6 wherein said plurality of pattern displaying areas are arranged in a plurality of areas which are obtained by dividing an annular record area circumferentially of said optical disc, said annular record area being provided on said record surface of said optical disc.

15. An optical disc comprising:
a record surface for recording information in terms of pit patterns formed on a plurality of tracks of the record surface and corresponding to data to-be-read by a playback system;
a pattern displaying area of the record surface extending over specified tracks, for presenting either of a character pattern or a graphic pattern having a visible size; and
an indication area of the record surface containing said pattern displaying area therein;
wherein in areas included in said pattern displaying area on said specified tracks, specified pit patterns having substantially a first average optical reflectance are formed, said average optical reflectances of said specified pit patterns differing, to a visually perceptible extend, from a second average reflectance of pit patterns formed in areas, on tracks, included in said indication area and not included in said pattern displaying area, borders of the second average optical reflectance indicating an outline of said character pattern or said graphic pattern having a visible size, and said specified pit patterns being pit patterns readable by said playback system as data.

16. An information recording medium as defined in claim 1, wherein said either of said character pattern or said graphic pattern is a member selected from the group consisting of a pattern which expresses a content of a copyright concerning the information recorded on said information recording medium, a trademark which is given to either of said information recording medium and the data recorded thereon, and a pattern which expresses a content of any other right concerning either of said information recording medium or said data recorded thereon.

17. An information recording medium as defined in claim 2, wherein said either of said character pattern or said graphic pattern is a member selected from the group consisting of a pattern which expresses a content of a copyright concerning the information recorded on said information recording medium, a trademark which is given to either of said information recording medium or the data recorded thereon, and a pattern which expresses a content of any other right concerning either of said information recording medium or said data recorded thereon.

18. An optical disc as defined in claim 3, wherein said either of said character pattern of said graphic pattern is a member selected from the group consisting of a pattern which expresses a content of a copyright concerning the information recorded on said optical disc, a trademark which is given to either of said optical disc or the data recorded thereon, and a pattern which expresses a content of any other right concerning either of said optical disc or said data recorded thereon.

19. An optical disc as defined in claim 3, wherein all the pit patterns formed in said record surface of said optical disc, including said pit patterns formed in said pattern displaying area, are formed in accordance with a CLV (constant linear velocity) system in which a tracking linear velocity of said tracks is held constant.

20. An optical disc as defined in claim 3, wherein said pattern displaying area is provided on, at least, either of an outer peripheral side of a lead-out area which indicates an end position of a data recording area included in said record surface, or an inner peripheral side of a lead-in area which indicates a start position of said data recording area.

21. An optical disc as defined in claim 3, wherein:
said pattern displaying area is provided on an outer peripheral side of a lead-out area which indicates an end position of a data recording area included in said record surface; and
a specular area in which no pits exist is interposed between said pattern displaying area and said lead-out area.

22. An optical disc as defined in claim 3, wherein:
said pattern displaying area is provided on an inner peripheral side of a lead-in area which indicates a start position of a data recording area included in said record surface; and
a specular area in which no pits exist is interposed between said pattern displaying area and said lead-in area.

* * * * *